United States Patent [19] [11] 4,448,957
Nagaoka [45] May 15, 1984

[54] PROCESS FOR PRODUCING AROMATIC POLYAMIDE-IMIDE

[75] Inventor: Kenji Nagaoka, Hirakata, Japan

[73] Assignee: Sumitomo Chemical Company, Limited, Osaka, Japan

[21] Appl. No.: 484,475

[22] Filed: Apr. 13, 1983

[30] Foreign Application Priority Data

Apr. 16, 1982 [JP] Japan ................................ 57-64195

[51] Int. Cl.³ ............................................ C08G 73/14
[52] U.S. Cl. .................................... 528/351; 528/125; 528/126; 528/128; 528/172; 528/179; 528/188; 528/207; 528/208; 528/223; 528/229; 528/350; 528/352; 528/353
[58] Field of Search .............. 528/125, 126, 128, 172, 528/179, 188, 223, 229, 350–353, 207, 208

[56] References Cited

U.S. PATENT DOCUMENTS

| 3,260,691 | 7/1966 | Lavin et al. | 528/351 |
| 3,661,832 | 5/1972 | Stephens | 528/351 |
| 3,663,492 | 5/1972 | Behr | 528/351 |
| 3,920,612 | 11/1975 | Stephens | 528/351 |

*Primary Examiner*—Lester L. Lee
*Attorney, Agent, or Firm*—Stevens, Davis, Miller & Mosher

[57] ABSTRACT

In a process for producing an aromatic polyamide-imide by polycondensation of an aromatic tricarboxylic acid and/or aromatic tricarboxylic anhydride and an aromatic diamine with heating in the presence of a dehydration catalyst, the improvement which comprises using a solvent containing sulfolane as a reaction medium.

11 Claims, No Drawings

PROCESS FOR PRODUCING AROMATIC POLYAMIDE-IMIDE

This invention relates to a process for producing an aromatic polyamide-imide and, more particularly, to a process for producing an aromatic polyamide-imide having a high molecular weight directly from inexpensive raw materials.

The aromatic polyamide-imide has been recently attracted much attention as an important industrial material because it possesses excellent heat resistance, chemical resistance, mechanical characteristics and electrical characteristics similar to those of polyimides, and moreover good processability in which aromatic polyimides are lacking.

Typical processes known for producing the aromatic polyamide-imide include a process to produce the polyamide-imide via polyamic acid starting from the reaction of a tricarboxylic anhydride halide and a diamine or a process to react a tricarboxylic acid anhydride with a diisocyanate. However, said processes are unsatisfactory from the industrial viewpoint, because they employ monomers which are expensive and difficult to handle, such as a tricarboxylic acid anhydride halide or a diisocyanate. As one of the processes to solve these difficulties, there has been proposed a process comprising reacting a tricarboxylic anhydride with a diamine directly by heating in an amide-type solvent such as N-methylpyrrolidone in the presence of a dehydration catalyst such as a phosphorus compound or boron compound to give the aromatic polyamide-imide (e.g. French Patent 1,515,066 and Japanese Patent Publication No. 4077/74).

The process proposed as above has, however, defects that it cannot yield an aromatic polyamide-imide of sufficiently high molecular weight and requires, even for obtaining a polymer of medium molecular weight, troublesome procedure of starting from very high initial concentration of monomers and successively diluting the concentration during the reaction.

Under these circumstances, the present inventors carried out an extensive study to establish a process for producing an aromatic polyamide-imide which is free from the defects mentioned above and is based on the economically advantageous method of direct polycondensation by heating of an aromatic tricarboxylic acid and/or anhydride thereof with an aromatic diamine. As a result, it was found that an aromatic polyamide-imide having a high molecular weight can be obtained without any difficulty when a solvent containing sulfolane is used as a reaction medium. The present invention has been accomplished on the basis of this finding.

An object of this invention is to provide a process for producing an aromatic polyamide-imide having a high molecular weight directly from inexpensive raw materials.

Other objects and advantages of this invention will become apparent from the following descriptions.

According to this invention, there is provided, in a process for producing an aromatic polyamide-imide by polycondensation of an aromatic tricarboxylic acid and/or aromatic tricarboxylic anhydride with an aromatic diamine by heating in the presence of a dehydration catalyst, the improvement which comprises using a solvent containing sulfolane as a reaction medium.

The aromatic tricarboxylic acid and the aromatic tricarboxylic anhydride used in this invention are each a compound represented respectively by the general formula

wherein $Ar_1$ represents a trivalent aromatic radical which may have an inert substituent such as a heterocyclic group or an alkyl, alkoxy or aryloxy group or a halogen atom and is bonded to two of the three carbonyl groups at adjacent carbon atoms thereof; and R represents a hydrogen atom or a lower alkyl group. Specific examples of $Ar_1$ include the followings:

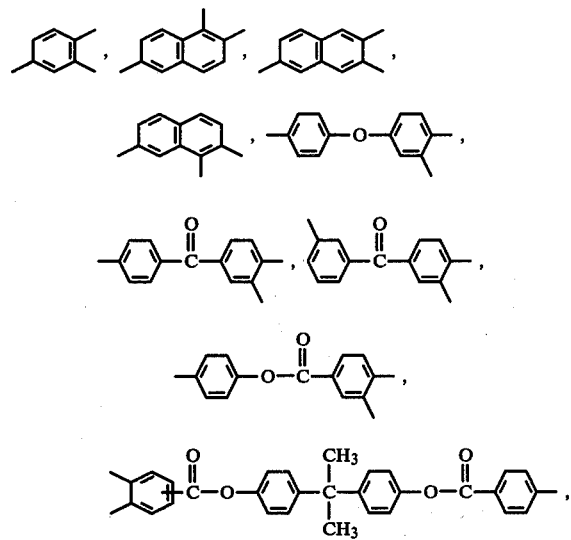

As the individual example of the aromatic tricarboxylic acid and aromatic tricarboxylic anhydride represented by the general formulas (I) and (II), mention may be made of trimellitic acid, 1,2,3-benzenetricarboxylic acid, trimellitic anhydride, 1,2,3-benzenetricarboxylic anhydride, 1,2,4-, 1,4,5- and 2,3,6-naphthalenetricarboxylic anhydride, 3,4,4'-benzophenonetricarboxylic anhydride and 3,4,4'-diphenylethertricarboxylic anhydride. Of these compounds, especially preferred are trimellitic acid and trimellitic anhydride.

A portion of the aromatic tricarboxylic acid and/or the aromatic tricarboxylic anhydride may be replaced with an aromatic dicarboxylic acid and/or an aromatic tetracarboxylic dianhydride and/or an aromatic aminocarboxylic acid within limits not harmful to the feature of the present process that an aromatic polyamide-imide having a sufficiently high molecular weight can be obtained. Examples of the aromatic dicarboxylic acid which may be used for said replacing include terephthalic acid, isophthalic acid, naphthalenedicarboxylic acid, 4,4'-biphenyldicarboxylic acid, 4,4'-diphenyletherdicarboxylic acid, 4,4'-benzophenonedicarboxylic acid, 4,4'-diphenylmethanedicarboxylic acid, 4,4'-diphenylsulfonedicarboxylic acid and 2-methylterephthalic acid. Examples of the aromatic tetracarboxylic dianhydride include pyromellitic dianhydride, biphenyltetracarboxylic dianhydride, benzophenonetetracarboxylic dianhydride and naphthalenetetracarboxylic dianhydride.

Examples of the aromatic aminocarboxylic acid include m-aminobenzoic acid and p-aminobenzoic acid.

The aromatic diamines used in this invention are the compounds represented by the general formula $$H_2N-Ar_2-NH_2 \qquad (III),$$

wherein $Ar_2$ represents a divalent aromatic radical which may have inert substituents and include, for example, the following:

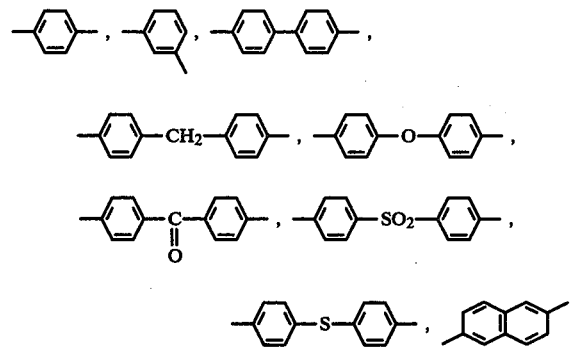

As the individual examples of the aromatic diamines represented by the general formula (III), mention may be made of p-phenylenediamine, m-phenylenediamine, toluylenediamine, 4,4'-diaminodiphenylmethane, 4,4'-diaminodiphenyl ether, 3,4'-diaminodiphenyl ether, 4,4'-diaminobiphenyl, 3,3'-dimethyl-4,4'-diaminobiphenyl, 4,4'-diaminodiphenyl sulfide and 2,6-diaminonaphthalene.

The object of this invention to obtain an aromatic polyamide-imide having a sufficiently high molecular weight can be attained only when a solvent containing sulfolane is used as the reaction medium. "A solvent containing sulfolane" means herein sulfolane itself or a solvent mixture of sulfolane with other solvents. The types and the mixing ratios to sulfolane of the other solvents to be used in combination with sulfolane to form the solvent mixture are not specifically restricted and may be selected freely within a limit not harmful to the production of an aromatic polyamide-imide having a sufficiently high molecular weight. Generally, a solvent mixture containing 20% by weight or more of sulfolane is preferred. Examples of said "other solvents" include hydrocarbons such as benzene, toluene, xylene, ethylbenzene, heptane and naphtha; halohydrocarbons such as o-dichlorobenzene and trichlene; nitrated hydrocarbons such as nitrobenzene and nitrotoluene; nitriles such as benzonitrile; ketones such as acetophenone and γ-butyrolactone; ethers such as diphenyl ether; amides such as N-methylpyrrolidone, N,N-dimethylacetamide, and N,N-dimethylformamide; sulfoxides such as dimethyl sulfoxide; and phenols such as phenol and cresol. The preferred solvent containing sulfolane are sulfolane and a mixture thereof with hydrocarbons, and sulfolane is especially preferred.

The above-mentioned solvent containing sulfolane can be used without any trouble even when it contains 5% or less of moisture, which is a normal content often found in such a solvent.

The reason why solvents containing sulfolane give an aromatic polyamide-imide having a remarkably high molecular weight as compared with amide-type solvents such as N-methylpyrrolidone which has hitherto been proposed is not definitely clear. However, it is estimated as one reason that sulfolane is stable and does not cause any side reactions with the monomer or the aromatic polyamide-imide formed even at higher temperatures.

The dehydration catalysts used in this invention are those of the type of catalyst used in dehydration-condensation reactions such as amidation, esterification and etherification. Examples of the catalysts include various kinds of phosphorus compounds, boron compounds and heteropoly-acids. As examples of phosphorus compounds, mention may be made of phosphorous acid esters such as trimethyl phosphite, triethyl phosphite, tributylphosphite, triphenyl phosphite, tricresyl phosphite, tricyclohexyl phosphite, diethyl phosphite, diphenyl phosphite and o-methyl-s,s'-diphenyl dithiophosphite; phosphoric acid esters such as tributyl phosphate, triphenyl phosphate, ethyl phenyl phosphate, and ethylene phenyl phosphate; phosphoric acids such as phosphoric acid, pyrophosphoric acid, metaphosphoric acid, tetrapolyphosphoric acid trimetaphosphoric acid and ethylmetaphosphoric acid; phosphonic acids such as phenylphosphonic acid, phosphines such as triphenylphosphine and trioctylphosphine; phosphine oxides such as triphenylphosphine oxide and 1-phenylphosphorin-3-oxide; and other phosphorus-containing compounds such as phosphorus pentoxide, ammonium dihydrogen phosphate, p-diethyl trimethylsilyl phosphate, N,N',N''-hexamethylphosphorus triamide, tetrabutyl pyrophosphite, phenylphosphonous acid, tetrakis-(2,4-di-tert-butylphenyl)-4,4'-biphenylene diphosphonite and distearyl pentaerythritol diphosphite. Of these dehydration catalysts, preferred ones are phosphorous acid esters and boric acid, and particularly preferred are triphenylphosphite and boric acid.

In carrying out the process of this invention, the above-mentioned aromatic tricarboxylic acid and/or aromatic tricarboxylic anhydride and aromatic diamine are used in approximately equimolar ratio to be reacted by heating in said solvent containing sulfolane in the presence of the above-mentioned dehydration catalyst.

The solvent containing sulfolane as mentioned above may be added all at once to the reaction system at the start of the reaction, or a portion thereof may be added during the reaction. Further, the solvent to be added during the reaction may be the other solvent mentioned above. The ratio of the solvent containing sulfolane used to the monomeric material is not specifically restricted, but generally selected from a range to make the concentration of the aromatic polyamide-imide formed 4 to 60% by weight. A preferred concentration range is 6–40% by weight. In the process of this invention, the procedure of starting with especially high initial concentration and successively diluting during the reaction is not necessary for the purpose of obtaining an aromatic polyamide-imide of high molecular weight, but it is effective to make the initial concentration relatively higher for the purpose of obtaining a high polymerization rate.

In the reaction according to this invention, the dehydration catalyst mentioned above may be added all at once at the beginning, or a part thereof may be added in several portions or continuously during the reaction to the reaction system. The amount of said dehydration catalyst to be used is generally about 0.01 mole% or more based on the aromatic diamine used. A larger amount of the catalyst causes no particular trouble and may be used without limitation, but the preferred range of the catalyst is 0.1 to 20 mole% when other factors such as economical efficiency are taken into consideration. The amount of catalyst of 0.01 mole% or less is unfavorable, because an aromatic polyamide-imide having a sufficiently high molecular weight cannot be obtained.

In the process of this invention, the reaction temperature is selected from a range of 160° to 300° C., preferably 190° to 250° C. Reaction temperatures lower than 160° C. or higher than 300° C. are both unfavorable, because at the former temperature the polymerization rate is impractically low while at the latter temperature undesirable side reactions such as decomposition and gellation occur.

The water formed with the progress of the polycondensation reaction should be removed rapidly from the reaction system to obtain a high molecular weight and a high polymerization rate. For removal of the water formed from the reaction system, there is applied a method to effect the reaction by heating while an inert gas such as nitrogen is being passed through the system, or a method to effect the reaction by heating while a part of the reaction medium is being distilled off.

The reaction time suitable to obtain the aromatic polyamide-imide having a sufficiently high molecular weight of this invention is generally 2 to 10 hours, although the favorable range thereof varies depending on the other conditions.

In conducting the process of this invention, a molecular weight regulator may be added to the reaction system with no restriction. Examples of the molecular weight regulators are monofunctional compounds including monocarboxylic acids such as benzoic acid and monoamines such as aniline.

In the process of this invention, the polycondensation proceeds either in a state of a homogeneous solution or, depending on the type of monomers selected, in a state of a slurry in which the aromatic polyamide-imide formed is present in precipitated form, to give, after a prescribed time of reaction, a solution or a slurry of the aromatic polyamide-imide, respectively. Said solution or slurry is used directly for molding or subjected to a process for isolating a solid polyamide-imide, such as precipitation by non-solvent. Examples of the non-solvents generally used for the method of precipitation by non-solvent are acetone, methanol and water. The solid aromatic polyamide-imide thus obtained is, if necessary, after treatments such as washing by acetone, methanol or water and steam-stripping, subjected to a usual drying process such as vacuum drying or fluidized drying to give the end product, the aromatic polyamide-imide in powdery or granular form.

According to the process of this invention described in detail above, an aromatic polyamide-imide having a high molecular weight can be produced very economically by a simple procedure from low-priced and easy-to-handle raw materials, namely, an aromatic tricarboxylic acid or aromatic tricarboxylic anhydride and an aromatic diamine. The aromatic polyamide-imide thus formed according to the process of this invention can, by virtue of its excellent characteristics originating from its high molecular weight, be fabricated to various articles such as heat-resistant films and fibers or compression molded, extrusion molded or injection molded products to be furnished on the market, and thus has a great industrial value.

This invention is illustrated further in detail below with reference to Examples, but the invention is not limited thereto.

The reduced viscosity ($\eta_{sp}/c$) referred to in Examples was measured in N-methylpyrrolidone at a temperature of 25° C. and at a concentration of 0.5 g/100 ml.

EXAMPLE 1

Into a 500 ml separable flask provided with a thermometer, an inlet tube for nitrogen, an outlet for distillate and a stirrer, were placed 19.2 g (0.1 mol) of trimellitic anhydride, 20.0 g (0.1 mol) of 4,4'-diaminodiphenyl ether, 0.62 g (0.002 mol) of triphenyl phosphite and 80 ml of sulfolane, and the mixture was heated up to an inner temperature of 200° C. over a period of one hour while being stirred under a nitrogen gas stream.

During the course of temperature rising, the water formed began to distill out at an inner temperature of about 140° C., and about 95% of the theoretical amount of water was distilled out when the temperature reached 200° C.

With continued stirring at 200° C., the reaction system became highly viscous at the point of time of about two hours after the start of the polymerization procedure. To facilitate the stirring, 50 ml of sulfolane was then added to the reaction mixture. The reaction was allowed to continue at 200° C. and, at the point of time of 3 hours and a half from the beginning, 30 ml of sulfolane was further added for the same purpose. At this time, the reaction system was in the form of a viscous slurry, in which a part of an aromatic polyamide-imide formed was precipitated.

After the reaction was conducted with heating at 200° C. for 5 hours from the start of polymerization procedure, the reaction mixture was cooled and then charged into 1 liter of acetone to precipitate the aromatic polyamide-imide formed. The polyamide-imide was separated by filtration, washed twice with boiling acetone and then dried at 160° C. for 24 hours under reduced pressure. There was obtained 34.9 g (98.0% yield) of an aromatic polyamide-imide in the form of a powder fresh green in color.

The reduced viscosity of the aromatic polyamide-imide obtained above was measured to show a high value of 1,204 dl/g. The confirmation of the polymer obtained being an aromatic polyamide-imide was made by the presence of characteristic absorptions of an imide group (1775 cm$^{-1}$ and 1715 cm$^{-1}$) and that of an amide group (1665 cm$^{-1}$) in infrared absorption spectroscopy.

A film was prepared by casting a 20% by weight solution of said aromatic polyamide-imide in N-methylpyrrolidone. The film was flexible and tough. Upon thermogravimetric analysis (in air, 10° C./minute), the film showed a 1% decomposition temperature of 430° C. and is thus of excellently high heat stability.

COMPARATIVE EXAMPLE 1

The polymerization and after-treatment were carried out in the same manner as in Example 1, except that N-methylpyrrolidone was used in place of sulfolane, to yield 34.0 g (95.5% yield) of an aromatic polyamide-imide which was dark green in color.

The measurement of reduced viscosity of said aromatic polyamide-imide showed a low value of 0.304 dl/g. A cast film prepared from its N-methylpyrrolidone solution was not self-sustaining.

EXAMPLES 2 to 5

The polymerization and after-treatment were carried out in the same manner as in Example 1, except that a mixture of 14.0 g (0.07 mol) of 4,4'-diaminodiphenyl ether and 3.24 g (0.03 mol) of m-phenylenediamine was used in place of 20.0 g of 4,4'-diaminodiphenyl ether and a solvent containing sulfolane indicated in Table 1 was used in place of sulfolane.

The results obtained were as shown in Table 1.

EXAMPLE 6

The polymerization and after-treatment was carried out in the same manner as in Example 1, except that 3,4'-diaminodiphenyl ether was used in place of 4,4'-diaminodiphenyl ether and 0.19 g (0.003 mol) of boric acid was used in place of 0.62 g of triphenyl phosphite, to yield 34.7 g (97.6% yield) of an aromatic polyamide-imide pale yellow in color.

Said polyamide-imide was of a high molecular weight having a reduced viscosity of 1.056 dl/g.

TABLE 1

| Example No. | Solvent containing sulfolane | Yield (%) | $\eta_{sp/c}$ (dl/g) | Property of cast film |
|---|---|---|---|---|
| 2 | Sulfolane (100) | 97.6 | 1.624 | Tough |
| 3 | Sulfolane (70) + kerosene (30) | 97.0 | 1.110 | " |
| 4 | Sulfolane (50) + nitrobenzene (50) | 98.1 | 1.260 | " |
| 5 | Sulfolane (70) + N—methylpyrrolidone (30) | 96.6 | 0.862 | " |

Note:
The values indicated in parenthesis in the column for solvent denote % by weight.

What is claimed is:

1. In a process for producing an aromatic polyamide-imide by polycondensation of an aromatic tricarboxylic acid and/or aromatic tricarboxylic anhydride and an aromatic diamine by heating in the presence of a dehydration catalyst, the improvement which comprises using a solvent containing sulfolane as a reaction medium.

2. A process according to claim 1, wherein the aromatic tricarboxylic acid and/or aromatic tricarboxylic anhydride is trimellitic anhydride.

3. A process according to claim 1, wherein the aromatic tricarboxylic acid and/or aromatic anhydride and the aromatic diamine are used in equimolar ratio.

4. A process according to claim 1, wherein the solvent containing sulfolane is a solvent selected from the group consisting of sulfolane, a solvent mixture of sulfolane with hydrocarbons, and a solvent mixture of sulfolane with nitrobenzene.

5. A process according to claim 4, wherein the solvent containing sulfolane is sulfolane.

6. A process according to claim 1, wherein the solvent containing sulfolane is used in a range of amount to make the concentration of the aromatic polyamide-imide formed 6 to 40% by weight.

7. A process according to claim 1, wherein the dehydration catalyst is a phosphorous acid ester and/or a boric acid.

8. A process according to claim 7, wherein the dehydration catalyst is triphenyl phosphite.

9. A process according to claim 7, wherein the dehydration catalyst is boric acid.

10. A process according to claim 1, wherein the dehydration catalyst is used in an amount of 0.1 to 20 mole % based on the aromatic diamine.

11. A process according to claim 1, wherein the reaction temperature is 160° to 300° C. and the reaction time is 2 to 10 hours.

* * * * *

UNITED STATES PATENT AND TRADEMARK OFFICE
CERTIFICATE OF CORRECTION

PATENT NO. : 4,448,957
DATED : May 15, 1984
INVENTOR(S) : Katsuji UENO et al

It is certified that error appears in the above—identified patent and that said Letters Patent is hereby corrected as shown below:

On the title page;
The identification of the inventors in the heading of the patent should read:

--

[75] Inventors: Katsuji Ueno, Hirakata, Japan;
Kenji Nagaoka, Hirakata, Japan.

--

Signed and Sealed this

Thirteenth Day of August 1985

[SEAL]

*Attest:*

DONALD J. QUIGG

*Attesting Officer*     *Acting Commissioner of Patents and Trademarks*